April 11, 1950     W. V. WESTFALL     2,503,532

PLOW

Filed March 12, 1948

INVENTOR.
WILLIS V. WESTFALL
BY Robert B. Harmon
AGENT

Patented Apr. 11, 1950

2,503,532

UNITED STATES PATENT OFFICE 2,503,532

PLOW

Willis V. Westfall, Amarillo, Tex.

Application March 12, 1948, Serial No. 14,550

6 Claims. (Cl. 97—164)

This invention relates to plows and more particularly to means for changing the position of the ground engaging portions of such plows.

The primary object of the invention is to provide a mechanism for rotatably carrying plow blades.

A more specific object of the invention is to provide a mechanism for rotatably carrying plow blades and a locking member associated with the blades to permit locking of the rotary member when the blades are in the ground engaging position.

Another object of the invention is to provide a means of attaching plow blades to a rotatable supporting member used to move the blades to and from engagement with the ground.

A further object of the invention is to provide a plow blade which is curved through substantially a 180 degree arc.

With the foregoing and other objects in view, the invention resides in the following specification and appended claims, certain embodiments and details of construction being shown in the attached drawing in which:

Figure 1:
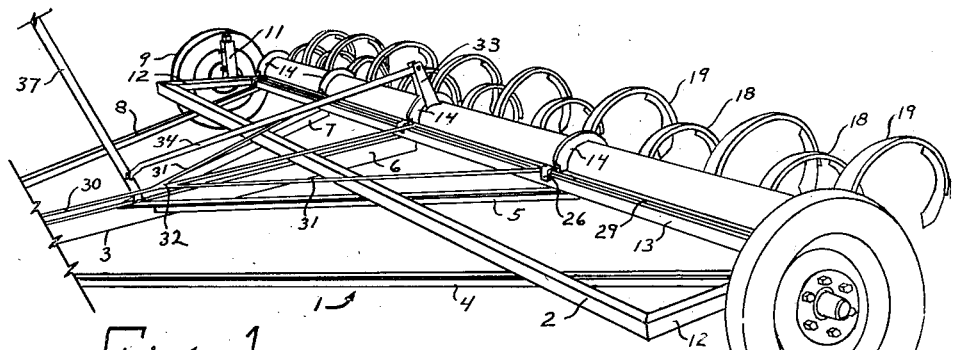
Figure 1 is a perspective view of the plow.

Referring more particularly to the drawings in Figure 1, the plow 1 has a rectangular frame 2 supported by a subframe 3, consisting of members 4, 5, 6, 7 and 8. Wheels 9 and 10 are suitably journaled to vertical adjustment members 11 which are carried by end members 12 of frame 2. The members 11, only one of which is in view in Figure 1, are preferably secured to the end members 12 by welding. Also all points of contact between frame 2 and subframe 3 are welded to make a rigid structure.

Secured by welding to rear member 13 of frame 2 are a plurality of circular brackets 14 for rotatably carrying a cylinder 15. The cylinder 15 is perforated along its periphery on one side at a plurality of points as at 16. The rotatable element used could be a solid circular bar but a cylinder is preferred because of its relatively light weight. Diametrically opposite such perforations is a second row of perforations as at 17. These perforations need not be diametrically opposite but such construction is preferred.

Figure 2:
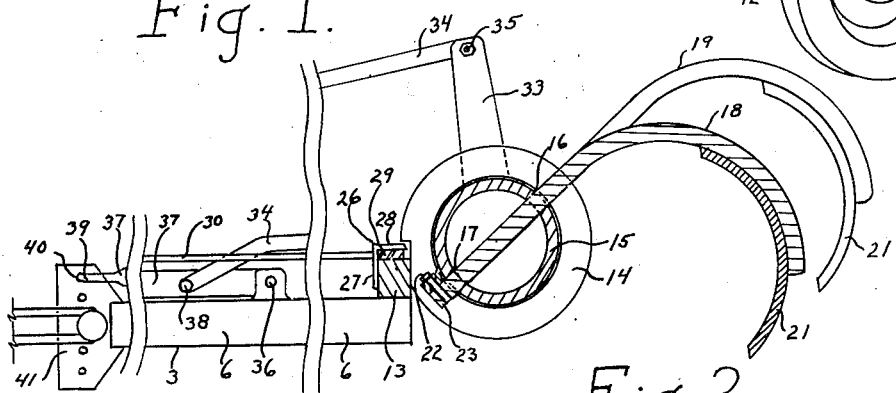
Figure 2 is a partially sectioned and partially broken view of a section of the plow showing the plow blades in the disengaged position.
Figure 3:
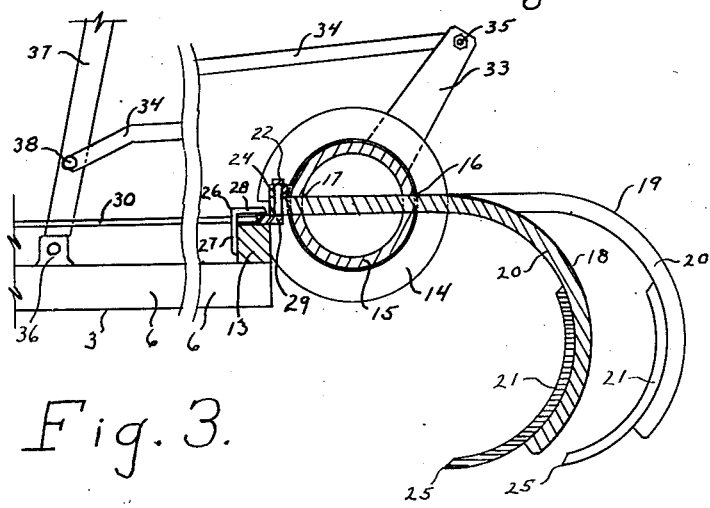
Figure 3 is similar to Figure 2 showing the plow blades in the locked engaged position.

The perforations are provided in cylinder 15 to receive one or more plow blades. The plow blade 18, consists of a shank 20 and a chisel 21 bolted thereto. The shank is shown in Figures 2 and 3 extending through perforations 16 and 17 in cylinder 15. A bolt 22 is threaded into a locking nut 24 which is welded to the front surface of the cylinder 15 at a point just above a perforation. The bolt extends through the protruding end 23 of shank 20 of blade 18. This bolt 22 prevents any tendency of the blade 18 to move rearwardly and at the same time permits a simplified means for releasing the shank 20 in the event replacement of blade 18 is desired. The blades 19 are secured to cylinder 15 in a similar manner to blades 18 and are similar in construction to those blades with the exception that the shanks of blades 19 are longer. It is to be noted that the chisels 21, which are curved, are bolted to the shanks 20 at that position which makes the chisel points 25 and the straight portions of the shanks 20 travel parallel to the line of motion of the plow during a plowing operation. The blades 18 and 19, in other words, make substantially a 180 degree arc between their supported and ground engaging ends.

Secured by welding or other suitable means to member 13 of frame 2 are a plurality of L-shaped locking brackets 26. The portions 27 of the brackets 26 are welded to the member 13 while portions 28 are spaced from said member to receive in sliding relationship a lock bar 29. The lock bar which extends along the length of member 13 is secured by welding to main actuating rod 30 and auxiliary aligning rods 31. These rods 31 are secured by welding at 32 to rod 30.

Mounted on opposite sides of the center bracket 14 and secured by welding to cylinder 15 are two crank arms 33. These crank arms 33 pivotally support one end of lever arm 34 at pivot point 35. Pivotally secured to a bracket 36 on member 6 of subframe 3 is an actuating lever 37. The lever 37 pivotally supports the other end of lever arm 34 at pivot point 38. The end 39 of lever 37 is in the position shown in Figure 2, when the blades are in the full disengaged position, and may hook into the top hole 40 of the standard type tractor hitch mechanism 41 shown secured to the end of member 6.

The operation of the mechanism on the plow is obvious. The plow is normally hitched to a tractor at 41. When it is desired to tow the plow from one place to another without performing a plowing operation the operating lever 37 is manually placed in the position shown in Figure 2. This rotates the cylinder 15, through lever arm 34 and crank arms 33 until the chisel points 25 of blades 18 and 19 are well above the ground, The lock bar 29 during this movement is in the position shown in Figure 2. When it is desired to perform a plowing operation the lever 37 is raised to the position shown in Figure 3 so that chisel points 25 will engage the ground upon clockwise rotation of cylinder 15. Upon reaching this position the lock bar 29 is pushed under the protruding ends 23 of the blades 18 and 19 by manual movement of rod 30. The lock bar thus resting on member 13 and under ends 23 and portions 28 of the L-shaped locking brackets 26 prevents counterclockwise rotation of cylinder 15 during the plowing operation.

The vertical adjustment members 11 are used to shift the frame relative to the wheels to vary the depth of the cut of the chisel teeth 21 in accordance with the standard practices known in the art of wheeled plows.

It is readily seen that a plurality of such cylinders and lock bars could be provided in making a larger plow and that the basic operating means and principles shown herein would merely require small structural changes in the framing and operating levers to properly function on such a plow.

I claim:

1. A plow comprising a frame, means to carry said frame, a rotatable cylinder carried by brackets on said frame, one or more plow blade shanks carried by said cylinder and a lock bar movably mounted on the frame adjacent the blade shanks to prevent rotation of the cylinder during a plowing operation.

2. A plow comprising a frame, means to carry said frame, a rotatable cylinder carried by brackets on said frame, one or more plow blade shanks carried by said cylinder, locking brackets secured to said frame adjacent the cylinder, and a lock bar mounted on the frame for relative movement thereto and to the locking brackets on the frame and the blade shanks to prevent rotation of the cylinder during a plowing operation.

3. A plow comprising a frame, means to carry said frame, one or more rotatable cylinders carried by brackets on said frame, one or more plow blade shanks carried by each of said cylinders, locking brackets secured to said frame adjacent the cylinders and a lock bar mounted on the frame for relative movement thereto and to the locking brackets on the frame and the blade shanks to prevent rotation of the cylinders during a plowing operation.

4. A plow comprising a frame, means to carry said frame, one or more rotatable cylinders with one or more sets of perforations, carried by brackets on the frame, a plow blade shank extending through each set of perforations so provided and having a protruding end beyond the periphery of the cylinder, a locking means mounted on the protruding end to removably secure the blade shank to the cylinder and a second locking means mounted on the frame for relative movement thereto and to the protruding end of the shank to prevent rotation of the cylinder when the blades are engaging the ground during a plowing operation.

5. A plow comprising a frame, means to carry the frame, one or more rotatable cylinders, with one or more sets of perforations, carried by brackets on the frame, a lever and crank means to rotate the cylinder, a plow blade shank extending through each set of perforations so provided and having a protruding end beyond the periphery of the cylinder, locking brackets mounted on the frame adjacent the cylinders, a lock bar mounted on the frame for relative movement thereto and to the locking brackets, and the protruding ends of the blades, and an actuating rod means to move the lock bar into simultaneous engagement with the frame, the locking brackets and the protruding ends of the shanks to prevent rotation of the cylinders during a plowing operation.

6. A plow comprising a frame, rotatable blade positioning means carried by brackets on said frame, one or more plow blade shanks carried by said rotatable means, the shank ends protruding through said blade positioning means, locking brackets secured to said frame adjacent the rotatable means, and a lock bar mounted on the frame for relative movement thereto and to the locking brackets and the protruding ends of the blade shanks which, when engaged, prevent rotation of the blade positioning means during a plowing operation.

WILLIS V. WESTFALL.

REFERENCES CITED

The following references are of record in the file of this patent:

UNITED STATES PATENTS

| Number | Name | Date |
|---|---|---|
| 61,023 | Ryder | Jan. 8 1867 |
| 96,576 | Gale | Nov. 9, 1869 |
| 187,177 | Robb et al. | Feb. 6, 1877 |
| 453,694 | Fowler | June 9, 1891 |
| 1,381,755 | Schurle | June 14, 1921 |
| 1,796,516 | Fujikawa | Mar. 17, 1931 |
| 2,092,679 | Nix | Sept. 7, 1937 |
| 2,430,223 | Goode | Nov. 4, 1947 |

FOREIGN PATENTS

| Number | Country | Date |
|---|---|---|
| 604,665 | France | Jan. 30, 1926 |